(12) United States Patent
Huang

(10) Patent No.: US 7,591,444 B2
(45) Date of Patent: Sep. 22, 2009

(54) FOLDABLE STAND FOR A DISPLAY

(75) Inventor: Ming-Ju Huang, Ping-Yuan (TW)

(73) Assignee: Hannspree, Inc., Taipei (TW)

( * ) Notice: Subject to any disclaimer, the term of this patent is extended or adjusted under 35 U.S.C. 154(b) by 628 days.

(21) Appl. No.: 11/028,775

(22) Filed: Jan. 3, 2005

(65) Prior Publication Data

US 2006/0146487 A1     Jul. 6, 2006

(51) Int. Cl.
*F16M 11/38* (2006.01)
(52) U.S. Cl. .................. 248/173; 248/166; 248/917
(58) Field of Classification Search ............... 16/110.1, 16/114.1, 409, 410; 248/917–923, 166, 168, 248/169, 173; 361/681
See application file for complete search history.

(56) References Cited

U.S. PATENT DOCUMENTS

| | | | | |
|---|---|---|---|---|
| 5,100,098 A | * | 3/1992 | Hawkins ................ | 248/291.1 |
| 5,396,399 A | * | 3/1995 | Blair et al. ............... | 361/681 |
| 5,632,373 A | * | 5/1997 | Kumar et al. ............ | 206/305 |
| 6,392,873 B1 | * | 5/2002 | Honda ..................... | 361/681 |
| 6,438,772 B1 | * | 8/2002 | Brown et al. ............. | 5/99.1 |
| 6,807,050 B1 | * | 10/2004 | Whitehorn et al. ........ | 361/681 |
| 6,980,426 B2 | * | 12/2005 | Kim ......................... | 361/683 |
| 7,143,478 B2 | * | 12/2006 | Quijano ................... | 16/445 |
| 2006/0077623 A1 | * | 4/2006 | Yeh .......................... | 361/681 |
| 2006/0168865 A1 | * | 8/2006 | Watanabe ................. | 40/745 |

\* cited by examiner

*Primary Examiner*—Amy J. Sterling
(74) *Attorney, Agent, or Firm*—Ladas & Parry LLP

(57) ABSTRACT

A foldable stand for supporting a display panel of a display includes a base and two wings. The base includes a main body and two buttresses that extend downwardly from a bottom end of the main body so as to cooperate with the main body to define a recess thereamong. Each of the wings has a pivot part that extends into the recess and that is pivoted to the main body so as to permit the wings to be rotatable relative to the main body between a first position, in which the wings extend laterally and oppositely from the main body so as to be adapted to stand on a reference surface together with the buttresses, and a second position, in which the wings are folded together and extend downwardly from the main body.

9 Claims, 7 Drawing Sheets

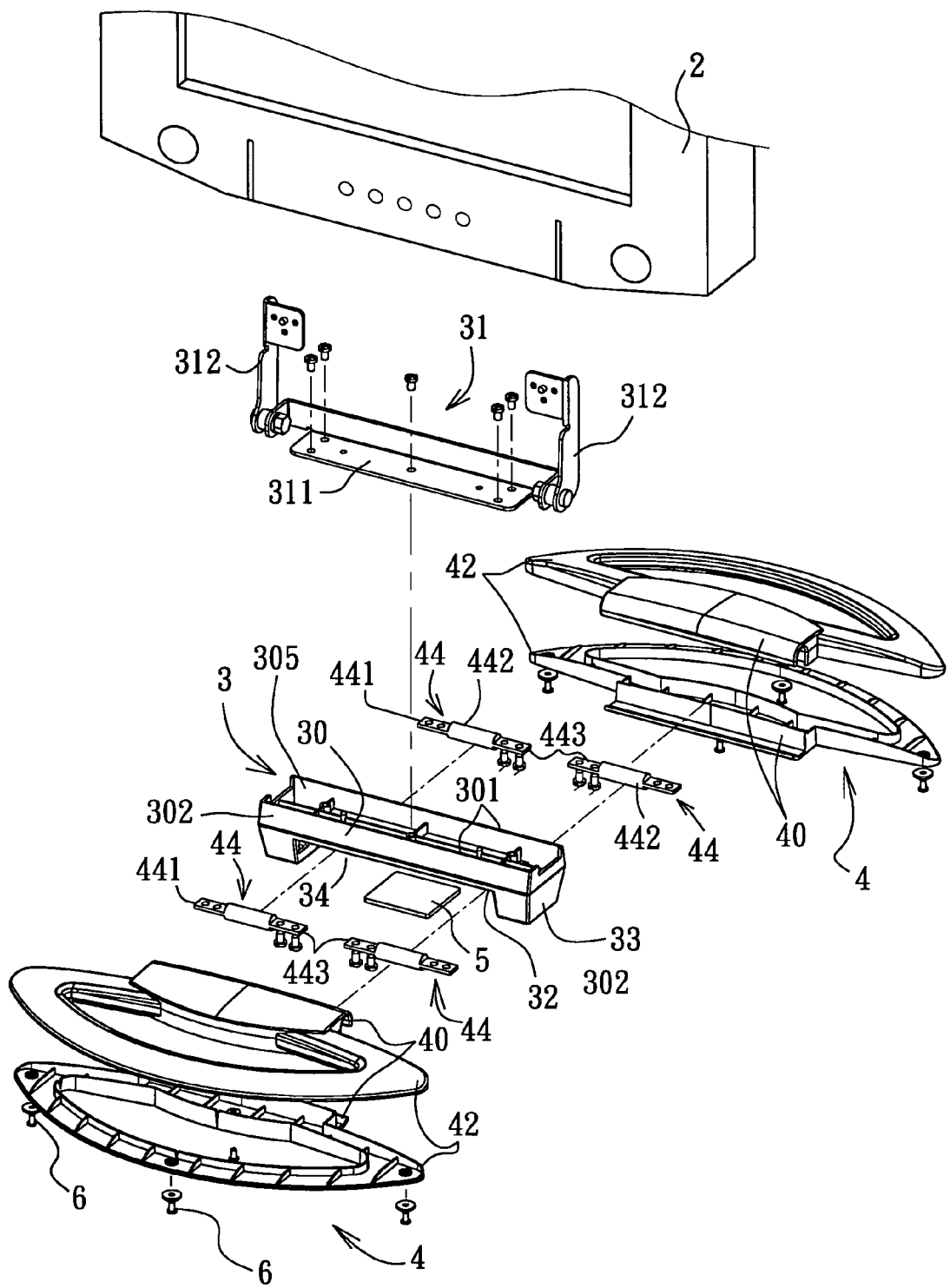
F I G. 3

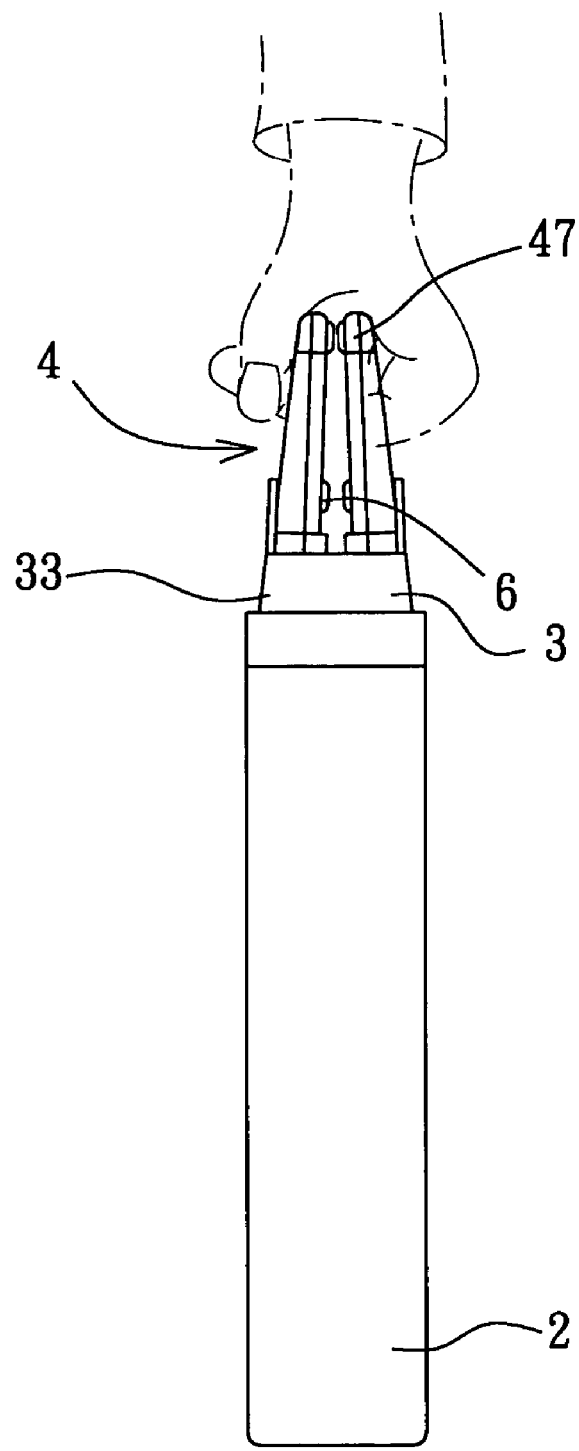
F I G. 8

US 7,591,444 B2

FOLDABLE STAND FOR A DISPLAY

BACKGROUND OF THE INVENTION

1. Field of the Invention

This invention relates to a foldable stand, more particularly to a foldable stand for supporting a display while it is unfolded and for used as a handle while is folded.

2. Description of the Related Art

FIGS. 1 and 2 illustrate a conventional display 1 that includes a display panel 12 and a stand 11 connected to and extending laterally from the display panel 12. The conventional display 1 is disadvantageous in that the same is non-foldable and therefore must be disassembled from the display panel 12 for transport and storage. The display panel 12 and the stand 11 are typically then placed in a box or other such container prior to transport or storage. These processes are cumbersome and time-consuming, and the display 1 disassembled and packed in this manner is bulky.

Hence, there is a need for a foldable stand used to support a display while it is unfolded, and further offers the convenience of being able to be used as a handle while it is folded, thereby greatly facilitating transport of the display, as well as minimizing the space occupied by the display when desiring to store the same.

SUMMARY OF THE INVENTION

Therefore, the object of the present invention is to provide a foldable stand that is adapted to support a display thereon and that is foldable to form into a handle for facilitating carrying of the display.

According to the present invention, there is provided a foldable stand that comprises: a base including an elongated main body and two buttresses, the main body having a bottom end, two opposite sides that are opposite to each other in a first direction, and two opposite end portions that are opposite to each other in a second direction transverse to the first direction, the buttresses extending downwardly from the bottom end of the main body, being disposed respectively at the end portions of the main body so as to cooperate with the main body to define a recess thereamong, and being adapted to stand on the reference surface; and two opposite wings, each of which has a pivot part that extends into the recess and that is pivoted to the main body so as to permit the wings to be rotatable relative to the main body between a first position, in which the wings are respectively disposed at the sides of the main body in a state extending laterally and oppositely in the first direction from the main body so as to be adapted to stand on the reference surface together with the buttresses, and a second position, in which the wings are folded together and extend downwardly from the main body.

BRIEF DESCRIPTION OF THE DRAWINGS

In drawings which illustrate an embodiment of the invention,

FIG. 3 is an exploded perspective view of the preferred embodiment of a foldable stand for a display panel according to this invention;

FIG. 8 is a perspective view similar to FIG. 7, but illustrating the display panel being carried by a user through use of the foldable stand.

DETAILED DESCRIPTION OF THE PREFERRED EMBODIMENT

Figure 1:
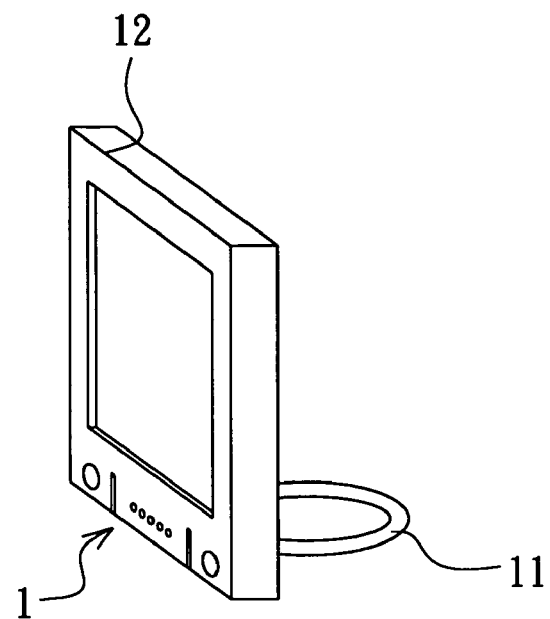
FIG. 1 is a perspective view of a conventional display.
Figure 2:
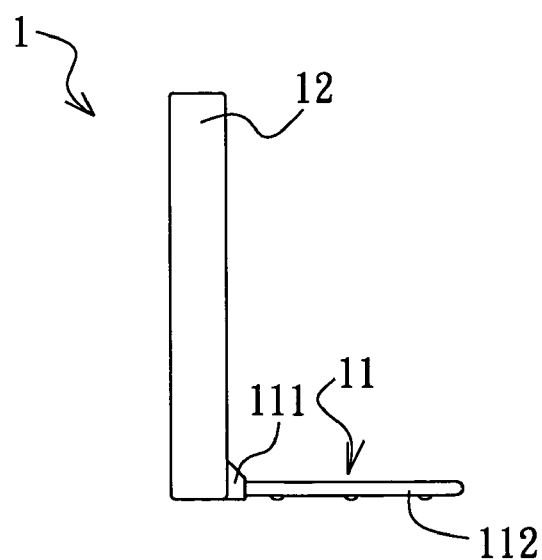
FIG. 2 is a side view of the conventional display of FIG. 1.
Figure 4:
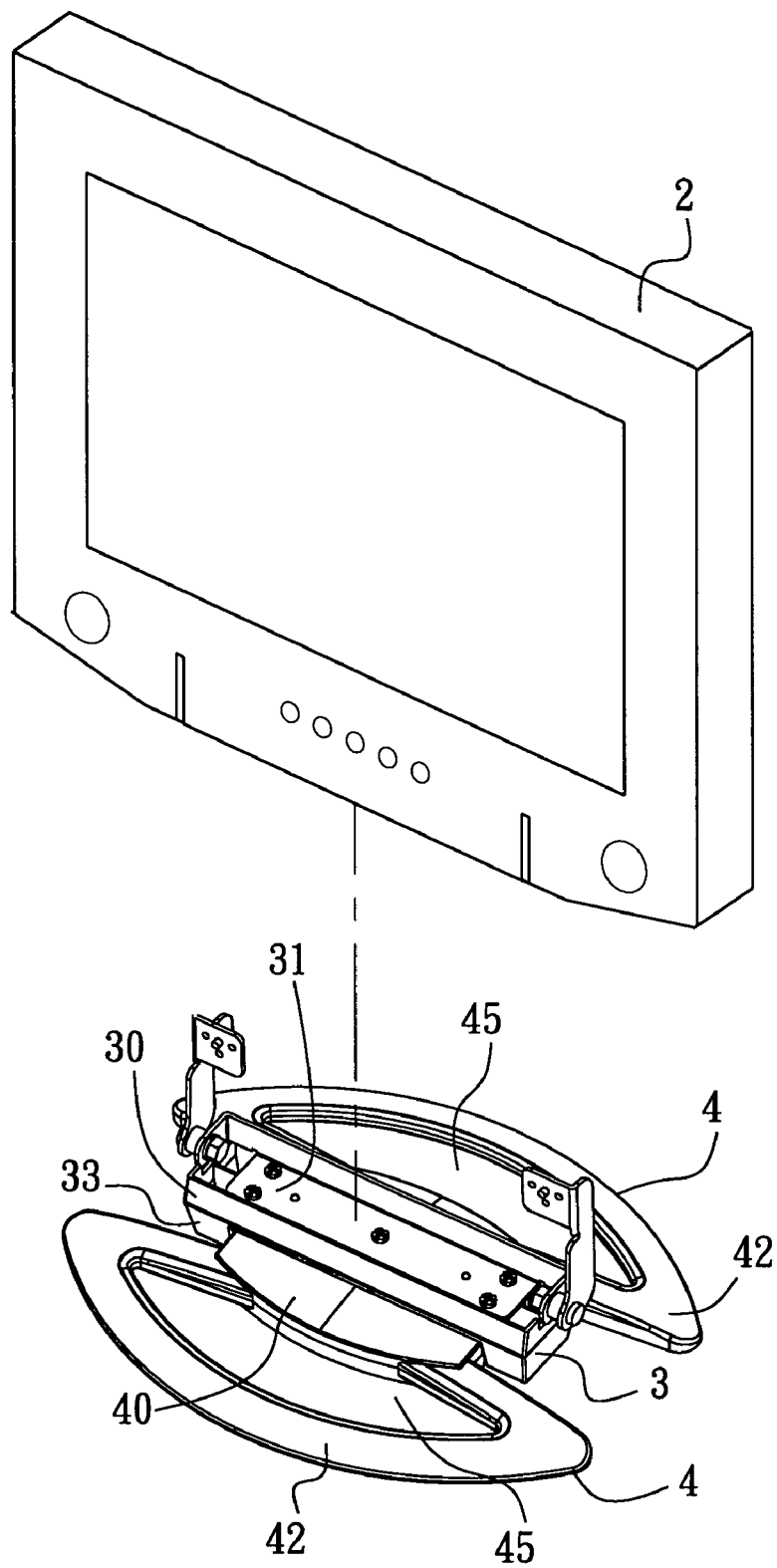
FIG. 4 is a perspective view of the preferred embodiment in an assembled state.
Figure 5:
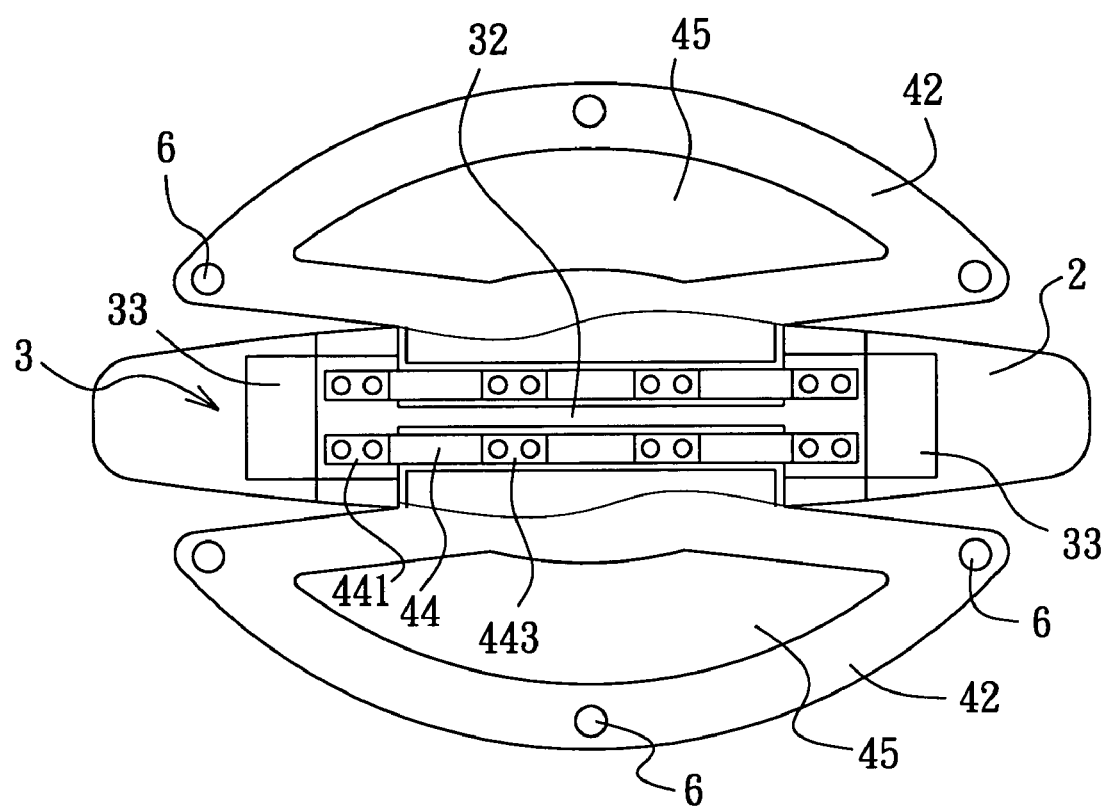
FIG. 5 is a schematic bottom view of the preferred embodiment.

FIGS. 3 to 5 illustrate the preferred embodiment of a foldable stand for a display according to this invention.

The foldable stand is adapted to be connected to a display panel 2, and includes a base 3 for supporting the display panel 2 thereon, and two opposite wings 4.

The base 3 includes an elongated main body 30 and two buttresses 33. The main body 30 has a bottom end 32, two opposite sides 301 that are opposite to each other in a first direction, and two opposite end portions 302 that are opposite to each other in a second direction transverse to the first direction. The buttresses 33 extend downwardly from the bottom end 32 of the main body 30, are disposed respectively at the end portions 302 so as to cooperate with the main body 30 to define a recess 34 thereamong, and are adapted to stand on a reference surface, such as a top surface of a table.

Figure 6:
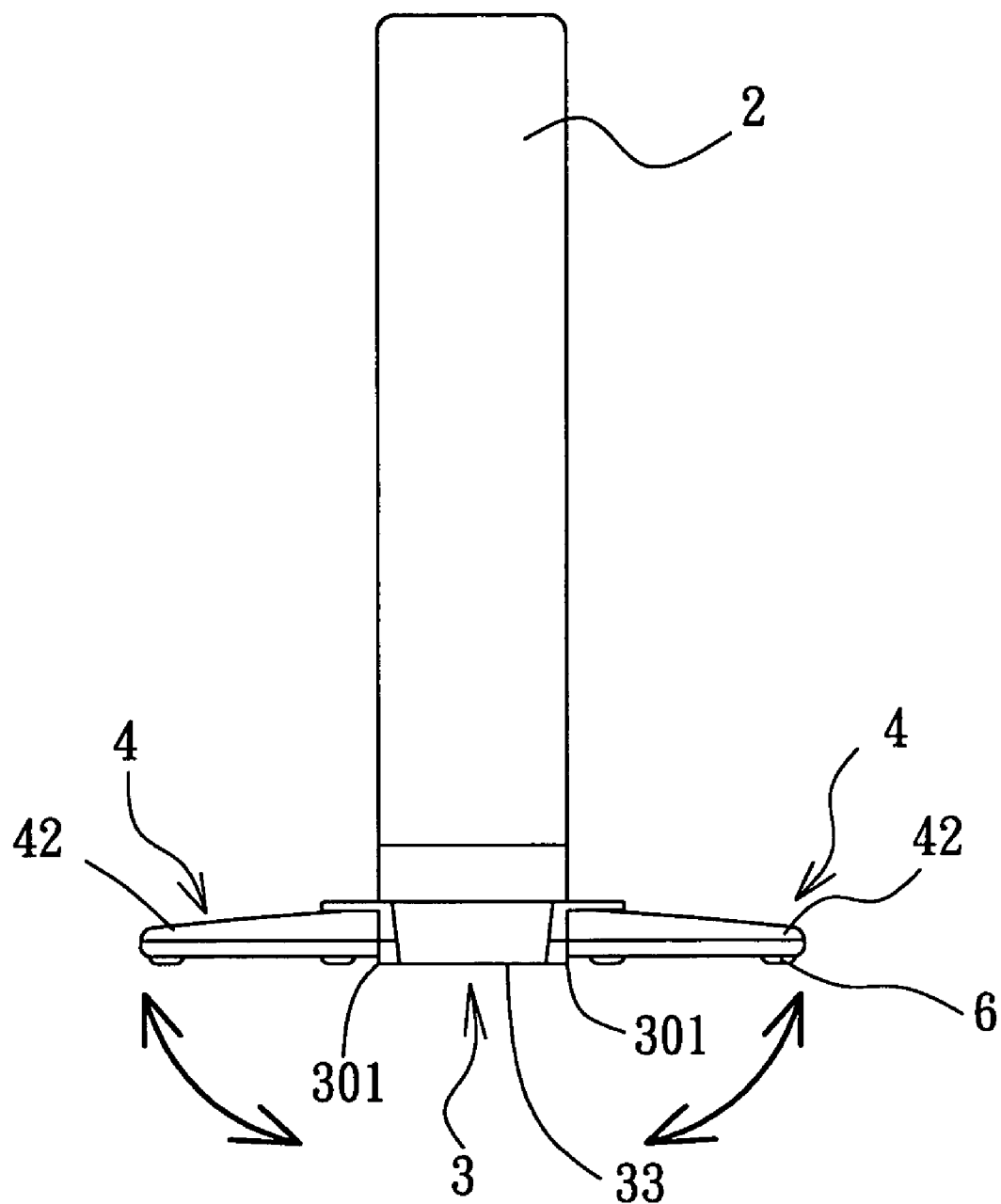
FIG. 6 is a schematic side view of the preferred embodiment disposed at a first position.
Figure 7:
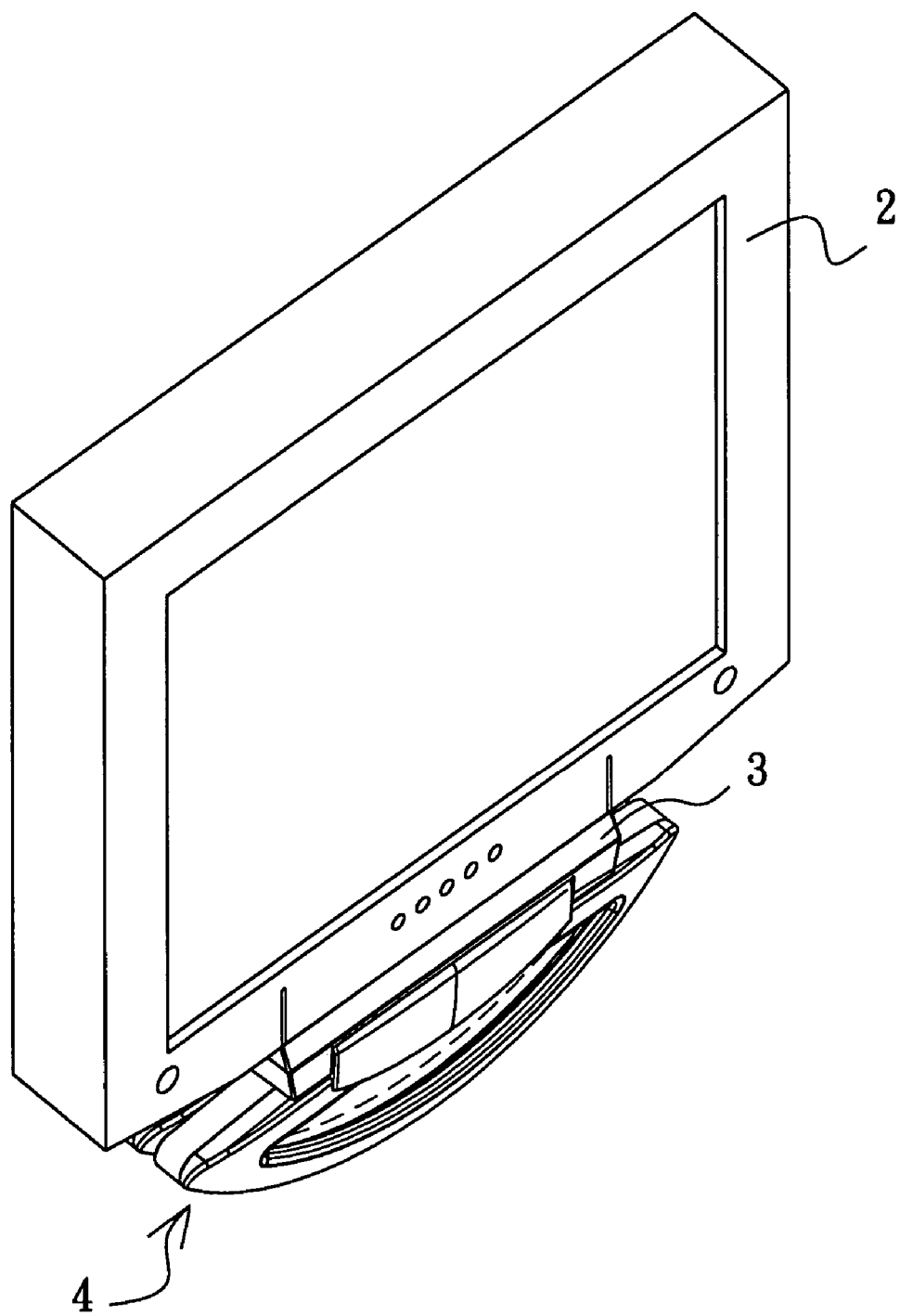
FIG. 7 is a perspective view of the preferred embodiment disposed at a second position.

Each of the wings 4 includes two complementary and substantially symmetrical halves, and has a pivot part 40 that extends into the recess 34 in the base 3 and that is pivoted to the main body 30 so as to permit the wings 4 to be rotatable relative to the main body 30 between a first position (see FIG. 6), in which the wings 4 are respectively disposed at the sides 301 of the main body 30 in a state extending laterally and oppositely in the first direction from the main body 30 so as to be adapted to stand on the reference surface together with the buttresses 33, and a second position (see FIG. 7), in which the wings 4 are folded together and extend downwardly from the main body 30.

In this embodiment, each of the wings 4 further has a frame part 42 that extends from the pivot part 40 and that defines a looped hole 45 in such a manner so as to permit the wings 4 to serve as a handle (see FIG. 8) when the wings 4 are disposed at the second position, thereby facilitating carrying of the display.

The base 3 further includes two opposite pairs of pivot joints 44, each of which has a shaft portion 442 that has two opposite ends, and first and second connecting portions 441, 443 that extend respectively from the ends of the shaft portion 442. The second connecting portions 443 of the pivot joints 44 are rotatable relative to the shaft portions 442 of the pivot joints 44, respectively. The pivot joints 44 are received in the recess 34 in the main body 30. The first connecting portions 441 of each of the pairs of the pivot joints 44 are respectively secured to the ends 302 of the main body 30. The second connecting portions 443 of each of the pairs of the pivot joints 44 are secured to the pivot part 40 of a respective one of the wings 4. The pivot part 40 of each of the wings 4 is sleeved around the shaft portions 442 of a respective one of the pairs of the pivot joints 44.

A soft pad 5 is disposed between the bottom end 32 of the main body 30 and the pivot parts 40 of the wings 4. A plurality of anti-slip pads 6 are provided on the frame part 42 of each of the wings 4.

The foldable stand further includes a post unit 31 that includes a connecting plate 311 with two opposite ends, and two opposite posts 312 which extend respectively and upwardly from the ends of the connecting plate 311 and which are rotatable relative to the connecting plate 311. The main body 30 defines a top recess 305 that is opposite to the bottom end 32 of the main body 30 and that extends from one of the ends to the other of the ends of the main body 30. The connecting plate 311 of the post unit 31 is received in the top recess 305 in the main body 30, and is fixed to the main body 30.

With the inclusion of the wings 4 and the pivot joints 44 in the foldable stand of this invention, the aforesaid drawback associated with the prior art can be eliminated. Moreover, the wings 4 can be converted into a handle when the same is disposed at the second position, thereby facilitating carrying of the display.

With the invention thus explained, it is apparent that various modifications and variations can be made without departing from the spirit of the present invention.

I claim:

1. A foldable stand for standing on a reference surface, comprising:
   a base including an elongated main body and two buttresses, said main body having a bottom end, two opposite sides that are opposite to each other in a first direction, and two opposite end portions that are opposite to each other in a second direction transverse to said first direction, said buttresses extending downwardly from said bottom end of said main body, being disposed respectively at said end portions of said main body so as to cooperate with said main body to define a recess thereamong, and being adapted to stand on the reference surface, and further including two opposite pairs of pivot joints, each of which has a shaft portion that has two opposite ends, and first and second connecting portions that extend respectively from said ends of said shaft portion, said second connecting portions being rotatable relative to said shaft portions, respectively, said pivot joints being received in said recess, said first connecting portions of each of said pairs of said pivot joints being respectively secured to said ends of said main body, said second connecting portions of each of said pairs of said pivot joints being secured to said pivot part of a respective one of said wings, said pivot part of each of said wings being sleeved around said shaft portions of a respective one of said pairs of said pivot joints; and
   two opposite wings, each of which has a pivot part that extends into said recess and that is pivoted to said main body so as to permit said wings to be rotatable relative to said main body between a first position, in which said wings are respectively disposed at said sides of said main body in a state extending laterally and oppositely in said first direction from said main body so as to be adapted to stand on the reference surface together with said buttresses, and a second position, in which said wings are folded together and extend downwardly from said main body.

2. The foldable stand of claim 1, wherein each of said wings further has a frame part that extends from said pivot part and that defines a looped hole in such a manner so as to permit said wings to serve as a handle when said wings are disposed at said second position.

3. The foldable stand of claim 1, further comprising a soft pad disposed between said bottom end and said pivot parts.

4. The foldable stand of claim 1, further comprising a post unit that includes a connecting plate with two opposite ends, and two opposite posts which extend respectively and upwardly from said ends of said connecting plate and which are rotatable relative to said connecting plate, said main body defining a top recess that is opposite to said bottom end and that extends from one of said ends to the other of said ends of said main body, said connecting plate being received in said top recess and being fixed to said main body.

5. A display comprising:
   a display panel; and
   a foldable stand connected to said display panel and including a base supporting said display panel thereon and including an elongated main body and two buttresses, said main body having a bottom end, two opposite sides that are opposite to each other in a first direction, and two opposite end portions that are opposite to each other in a second direction transverse to said first direction, said buttresses extending downwardly from said bottom end of said main body, being disposed respectively at said end portions of said main body so as to cooperate with said main body to define a recess thereamong, and being adapted to stand on a reference surface; and two opposite wings, each of which has a pivot part that extends into said recess and that is pivoted to said main body so as to permit said wings to be rotatable relative to said main body between a first position, in which said wings are respectively disposed at said sides of said main body in a state extending laterally and oppositely in said first direction from said main body so as to be adapted to stand on the reference surface together with said buttresses, and a second position, in which said wings are folded together and extend downwardly from said main body.

6. The display of claim 5, wherein each of said wings further has a frame part that extends from said pivot part and that defines a looped hole in such a manner so as to permit said wings to serve as a handle when said wings are disposed at said second position.

7. The display of claim 5, wherein said base further includes two opposite pairs of pivot joints, each of which has a shaft portion that has two opposite ends, and first and second connecting portions that extend respectively from said ends of said shaft portion, said second connecting portions being rotatable relative to said shaft portions, respectively, said pivot joints being received in said recess, said first connecting portions of each of said pairs of said pivot joints being respectively secured to said ends of said main body, said second connecting portions of each of said pairs of said pivot joints being secured to said pivot part of a respective one of said wings, said pivot part of each of said wings being sleeved around said shaft portions of a respective one of said pairs of said pivot joints.

8. The display of claim 5, further comprising a soft pad disposed between said bottom end and said pivot parts.

9. The display of claim 5, further comprising a post unit that includes a connecting plate with two opposite ends, and two opposite posts which extend respectively and upwardly from said ends of said connecting plate and which are rotatable relative to said connecting plate, said main body defining a top recess that is opposite to said bottom end and that extends from one of said ends to the other of said ends of said main body, said connecting plate being received in said top recess and being fixed to said main body.

* * * * *